United States Patent
Kubota et al.

(10) Patent No.: US 9,238,744 B2
(45) Date of Patent: Jan. 19, 2016

(54) NON-AQUEOUS INK COMPOSITION FOR INK JET RECORDING AND INK JET RECORDING METHOD

(71) Applicant: Seiko Epson Corporation, Tokyo (JP)

(72) Inventors: Kenichiro Kubota, Matsumoto (JP); Akihito Sao, Matsumoto (JP); Makoto Nagase, Shiojiri (JP); Jun Ito, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/220,424

(22) Filed: Mar. 20, 2014

(65) Prior Publication Data

US 2015/0035895 A1 Feb. 5, 2015

(30) Foreign Application Priority Data

Mar. 22, 2013 (JP) ................................ 2013-059599

(51) Int. Cl.
| | | |
|---|---|---|
| *B32B 3/02* | (2006.01) | |
| *C09D 11/36* | (2014.01) | |
| *B41J 2/01* | (2006.01) | |
| *C09D 11/033* | (2014.01) | |
| *C09D 11/322* | (2014.01) | |

(52) U.S. Cl.
CPC . *C09D 11/36* (2013.01); *B41J 2/01* (2013.01); *C09D 11/033* (2013.01); *C09D 11/322* (2013.01); *Y10T 428/24802* (2015.01)

(58) Field of Classification Search
CPC . C09D 11/30; C09D 11/36; Y10T 428/24802
See application file for complete search history.

(56) References Cited

U.S. PATENT DOCUMENTS

| | | | |
|---|---|---|---|
| 2004/0266907 A1 | 12/2004 | Sugita et al. | |
| 2008/0097013 A1* | 4/2008 | Mizutani | 524/107 |
| 2010/0056679 A1 | 3/2010 | Shiotani et al. | |
| 2012/0200633 A1 | 8/2012 | Aoyama | |
| 2012/0212554 A1 | 8/2012 | Koike et al. | |

FOREIGN PATENT DOCUMENTS

| | | |
|---|---|---|
| JP | 2005-330298 A | 12/2005 |
| JP | 4108112 B1 | 6/2008 |
| JP | 2012-162002 A | 8/2012 |
| JP | 2012-183817 A | 9/2012 |
| WO | 2004/007626 A1 | 1/2004 |

\* cited by examiner

*Primary Examiner* — Elizabeth Mulvaney
(74) *Attorney, Agent, or Firm* — Nutter McClennen & Fish LLP; John J. Penny, Jr.

(57) ABSTRACT

A colorant, lactone having a content in a range of 5% by mass to 40% by mass, a first solvent having a water vapor pressure of 2 hPa or more and a content in a range of 5% by mass to 18% by mass at 20° C., and a second solvent having a water vapor pressure of 0.9 hPa or more and a content in a range of 2% by mass to 80% by mass at 20° C. are contained, a sum of the content of the first solvent and the content of the second solvent is 20% by mass or more, and the second solvent is at least one solvent selected from a group consisting of (poly)alkylene glycol monoalkyl ether and (poly)alkylene glycol dialkyl ether.

21 Claims, 1 Drawing Sheet

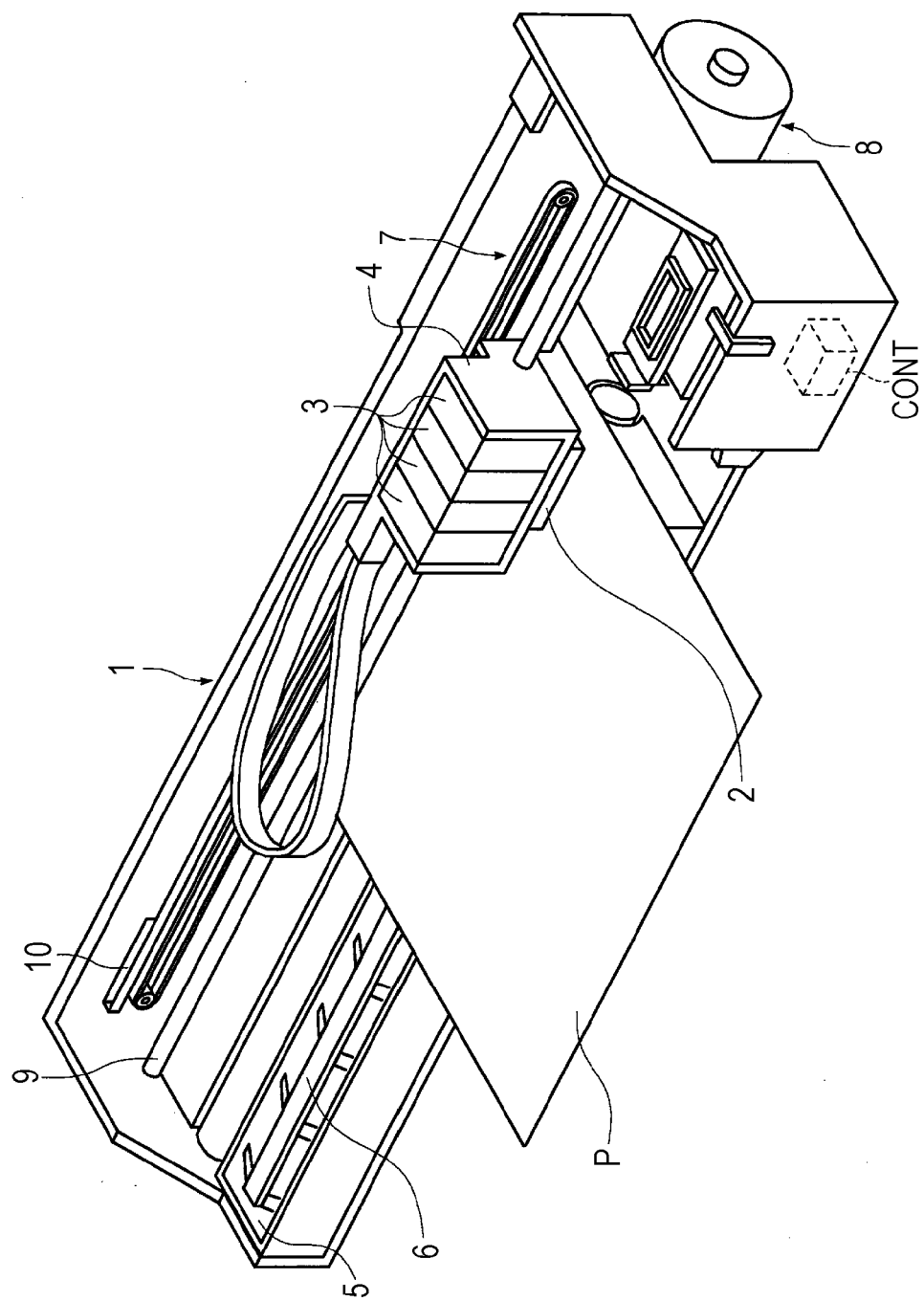

NON-AQUEOUS INK COMPOSITION FOR INK JET RECORDING AND INK JET RECORDING METHOD

BACKGROUND

1. Technical Field

The present invention relates to a non-aqueous ink composition for ink jet recording and an ink jet recording method in which the non-aqueous ink composition is used.

2. Related Art

In the past, an ink jet recording method in which images are recorded on an absorbent recording medium such as paper using fine ink droplets ejected from a nozzle in a recording head was known. Aqueous ink containing water as a principal solvent was widely distributed as ink used in the above-described ink jet recording method.

Meanwhile, the ink jet recording method has been used for recording on a variety of recording media in a variety of fields. In particular, from a viewpoint of the competition with printing methods in which images are recorded on a recording medium having a low absorbability, non-aqueous ink containing little water as a solvent has been developed instead of the aqueous ink of the related art.

For example, International Publication No. 2004/007626 discloses an oil-based ink composition for ink jet recording which contains a colorant, polyoxyethylene glycol dialkyl ether and a lactone-based solvent. The above-described oil-based ink composition is suitable for printing on a recording medium made of vinyl chloride or the like and enables the printing of images that are excellent in terms of print quality, printing stability, print drying properties, and the storage stability of ink.

In addition, JP-A-2005-330298 discloses an oil-based pigment ink composition for ink jet recording which contains a pigment and a (poly)propylene glycol derivative. According to the above-described oil-based pigment ink composition, printing on a recording medium made of vinyl chloride or the like is possible, and it is also possible to print images that can bear outdoor environments.

However, there was a problem in that, depending on the type or combination of solvents contained in the above-described non-aqueous ink, the drying speed or fixability of ink attached to a recording medium significantly degraded. When the drying speed of ink is low (that is, the drying property is poor), components (particularly, colorants such as pigments) contained in the ink can agglomerate, and therefore there is a case in which agglomeration variation occurs in images. In addition, when the fixability of ink is poor, the abrasion resistance of images recorded on a recording medium is impaired.

Even if a solvent having an effect that improves the fixability of the ink can be selected to solve the above-described problem, there is a case in which the glossiness of recorded images degrades and thus the qualities of the images degrade. In addition, even if a solvent that can suppress the occurrence of the agglomeration variation of the ink can be selected, there is a case in which the ejection stability of a recording head during recording degrades.

SUMMARY

An advantage of some aspects of the invention is to provide a non-aqueous ink composition for ink jet recording which can record images that has an excellent ejection stability, can suppress the occurrence of agglomeration variation in images, has an excellent glossiness, and has an excellent abrasion resistance by solving at least some of the above-described problems, and an ink jet recording method in which the above-described non-aqueous ink composition is used.

The invention can be realized in forms of the following aspects or the following application examples.

Application Example 1

According to an aspect of the invention, there is provided a non-aqueous ink composition for ink jet recording containing a colorant; lactone having a content in a range of 5% by mass to 40% by mass; a first solvent having a water vapor pressure of 2 hPa or more and a content in a range of 5% by mass to 18% by mass at 20° C.; and a second solvent having a water vapor pressure of 0.9 hPa or more and a content in a range of 2% by mass to 80% by mass at 20° C., in which a sum of the content of the first solvent and the content of the second solvent is 20% by mass or more, and the second solvent is at least one solvent selected from a group consisting of (poly)alkylene glycol monoalkyl ether and (poly)alkylene glycol dialkyl ether.

Application Example 2

In the non-aqueous ink composition for ink jet recording according to Application Example 1, a number of carbon atoms in the lactone may be in a range of 2 to 9.

Application Example 3

In the non-aqueous ink composition for ink jet recording according to Application Example 1 or 2, the first solvent may be at least one solvent selected from a group consisting of ester-based solvents, ketone-based solvents, alcohol-based solvents and amide-based solvents.

Application Example 4

In the non-aqueous ink composition for ink jet recording according to any one of Application Examples 1 to 3, the second solvent may be a compound represented by the following formula (1).

$$R^1-(O-R^3)_n-O-R^2 \qquad (1)$$

In the above-described formula (1), $R^2$ represents a hydrogen atom or an alkyl group having 1 to 4 carbon atoms, $R^2$ represents an alkyl group having 1 to 4 carbon atoms, $R^3$ represents an ethylene group or a propylene group, and n represents an integer in a range of 1 to 4.

Application Example 5

In the non-aqueous ink composition for ink jet recording according to any one of Application Examples 1 to 4, the content of the lactone may be in a range of 10% by mass to 30% by mass.

Application Example 6

In the non-aqueous ink composition for ink jet recording according to any one of Application Examples 1 to 5, the content of the first solvent may be in a range of 5% by mass to 15% by mass.

Application Example 7

In the non-aqueous ink composition for ink jet recording according to any one of Application Examples 1 to 6, the content of the second solvent may be in a range of 20% by mass to 70% by mass.

Application Example 8

In the non-aqueous ink composition for ink jet recording according to any one of Application Examples 1 to 7, the second solvent may be at least a solvent selected from a group consisting of compounds represented by the following formula (2), the following formula (3) and the following formula (4).

$$HO-R^5-O-R^4 \qquad (2)$$

In the above-described formula (2), $R^4$ represents an alkyl group having 1 to 4 carbon atoms, and $R^5$ represents an ethylene group or a propylene group.

$$R^6O-R^8-O-R^7 \qquad (3)$$

In the above-described formula (3), $R^6$ and $R^7$ represent a methyl group or an ethyl group respectively, and $R^8$ represents an ethylene group or a propylene group. However, in a case in which $R^8$ is a propylene group, $R^7$ is a methyl group.

$$CH_3-(O-R^{10})_m-O-R^9 \qquad (4)$$

In the above-described formula (4), $R^9$ represents a methyl group or an ethyl group, $R^{10}$ represents an ethylene group or a propylene group, and m represents an integer in a range of 2 to 4.

Application Example 9

In the non-aqueous ink composition for ink jet recording according to any one of Application Examples 1 to 8, a resin may be further contained, and the colorant may be a pigment.

Application Example 10

According to another aspect of the invention, there is provided an ink jet recording method including a step of ejecting liquid droplets of the non-aqueous ink composition according to any one of Application Examples 1 to 9 from a recording head so as to attach the liquid droplets to a recording medium.

Application Example 11

In the ink jet recording method according to Application Example 10, recording may be carried out in an environment having a humidity of 50% RH or more.

Application Example 12

In the ink jet recording method according to Application Example 10 or 11, in the step of attaching the liquid droplets to the recording medium, a heating temperature of the recording medium may be in a range of 35° C. to 45° C.

BRIEF DESCRIPTION OF DRAWING

The invention will be described with reference to the accompanying a drawing, wherein like numbers reference like elements.

FIGURE is a perspective view illustrating a configuration of an ink jet printer that can be used in an embodiment.

DESCRIPTION OF EXEMPLARY EMBODIMENTS

Hereinafter, a preferable embodiment of the invention will be described. The embodiment to be described below simply describes an example of the invention. In addition, the invention is not limited to the following embodiment, and also includes a variety of modification examples carried out within the scope of the purpose of the invention.

In the invention, an "image" refers to a print pattern formed of a group of dots, and examples thereof include text prints and solid prints.

In the invention, a "non-aqueous ink composition" refers to an ink composition which contains an organic solvent as a principal solvent but does not contain water as a principal solvent. The content of water in the composition is preferably 3% by mass or less, more preferably 1% by mass or less, more preferably less than 0.05% by mass, more preferably less than 0.01% by mass, still more preferably less than 0.005% by mass, and most preferably less than 0.001% by mass. Alternately, the non-aqueous ink composition may be an ink composition that does not substantially contain water. The "ink composition that does not substantially contain water" refers to an ink composition to which water is not intentionally added.

In the invention, (poly)alkylene glycol monoalkyl ether refers to both alkylene glycol monoalkyl ether and polyalkylene glycol monoalkyl ether, and (poly)alkylene glycol dialkyl ether refers to both alkylene glycol dialkyl ether and polyalkylene glycol dialkyl ether.

1. Non-Aqueous Ink Composition

A non-aqueous ink composition for ink jet recording according to an embodiment of the invention contains a colorant, lactone having a content in a range of 5% by mass to 40% by mass, a first solvent having a water vapor pressure of 2 hPa or more and a content in a range of 5% by mass to 18% by mass at 20° C., and a second solvent having a water vapor pressure of 0.9 hPa or more and a content in a range of 2% by mass to 80% by mass at 20° C., in which the sum of the content of the first solvent and the content of the second solvent is 20% by mass or more, and the second solvent is at least one solvent selected from a group consisting of (poly)alkylene glycol monoalkyl ether and (poly)alkylene glycol dialkyl ether. Hereinafter, the non-aqueous ink composition for ink jet recording according to the present embodiment will be described in detail.

1.1. Lactone

The non-aqueous ink composition according to the embodiment contains lactone. Then, it is possible to infiltrate the non-aqueous ink composition into a recording medium by dissolving some of a recording surface (preferably a recording surface containing a vinyl chloride resin). When the non-aqueous ink composition is infiltrated into a recording medium as described above, it is possible to improve the abrasion resistance of images recorded on the recording medium. Since lactone has an excellent infiltration property into recording media as described above, it is possible to obtain images having an excellent abrasion resistance even in a highly humid environment.

In the invention, "lactone" collectively refers to cyclic compounds having an ester group (—CO—O—) in a cycle. The lactone is not particularly limited as long as the lactone satisfies the above-described definition, but is preferably lactone having 2 to 9 carbon atoms. Specific examples of the lactone include α-ethyl lactone, α-acetolactone, β-propiolactone, γ-butyrolactone, δ-valerolactone, ε-caprolactone, ζ-enanthiolactone, η-caprylolactone, γ-valerolactone, γ-heptalactone, γ-nonalactone, β-methyl-δ-valerolactone, 2-butyl-2-ethyl propiolactone, α,α-diethyl propiolactone, and the like. Among the above-described lactones, γ-butyrolactone is particularly preferable. The above-exemplified lactones may be used solely or in a mixture of two or more lactones.

The content of the lactone needs to be in a range of 5% by mass to 40% by mass, and is preferably in a range of 10% by mass to 30% by mass, and more preferably in a range of 10% by mass to 20% by mass with respect to the total mass of the non-aqueous ink composition. When the content of the lactone is in the above-described range, it becomes easy to procure both the improvement of the abrasion resistance and the retention of the glossiness of recorded images. In contrast, when the content of the lactone is below the above-described range, the abrasion resistance of recorded images degrades, and, when the content of the lactone is above the above-described range, the glossiness of recorded images degrades.

1.2. First Solvent

The non-aqueous ink composition according to the embodiment contains the first solvent having a water vapor pressure of 2 hPa or more at 20° C. Since the first solvent has a high water vapor pressure of 2 hPa or more at 20° C., the first solvent is a solvent having an excellent volatility. Since the first solvent is volatilized before the colorant (particularly the pigment) and the like contained in the ink that is attached to a recording medium agglomerate, it is possible to suppress the occurrence of agglomeration variation in recorded images.

Any solvent may be used as the first solvent as long as the water vapor pressure is 2 hPa or more at 20° C. and is not the second solvent described below, and, specifically, it is possible to use at least one solvent selected from a group consisting of ester-based solvents, ketone-based solvents, alcohol-based solvents and amide-based solvents.

Specific examples of the ester-based solvents include 2-methyl propyl acetate (17.3 hPa), butyl acetate (12 hPa), 3-methyl butyl acetate (isopentyl acetate, 8 hPa), 3-methoxy butyl acetate (3-methoxy butyl acetate, 3.2 hPa), methyl lactate (3.9 hPa), ethyl lactate (2.8 hPa), and the like. Specific examples of the ketone-based solvents include cyclic ketones such as cyclopentanone (15 hPa) and cyclohexanone (5 hPa), 4-methyl-2-pentanone (21 hPa), and the like. Specific examples of the alcohol-based solvents include 2-methyl-1-propanol (12 hPa), 1-butanol (7 hPa), 2-butanol (16 hPa), and the like. Examples of the amide-based solvents include N,N-dimethylacetamide (3.3 hPa) and the like. The above-exemplified first solvents may be used solely or in a mixture of two or more first solvents.

The water vapor pressure of the first solvent at 20° C. needs to be 2 hPa or more, and, from the viewpoint of suppressing the occurrence of agglomeration variation and ensuring the ejection stability of the recording head, the water vapor pressure is preferably in a range of 2 hPa to 15 hPa, and more preferably in a range of 5 hPa to 15 hPa.

The content of the first solvent needs to be in a range of 5% by mass to 18% by mass, and is preferably in a range of 5% by mass to 15% by mass, and more preferably in a range of 10% by mass to 15% by mass with respect to the total mass of the non-aqueous ink composition. When the content of the first solvent is in the above-described range, it becomes easy to procure both the ensuring of the ejection stability of the recording head and the suppression of agglomeration variation in recorded images. In contrast, when the content of the first solvent is below the above-described range, agglomeration variation is likely to occur in recorded images, and, when the content of the first solvent is above the above-described range, the ejection stability of the recording head degrades.

1.3. Second Solvent

The non-aqueous ink composition according to the embodiment contains the second solvent having a water vapor pressure of 0.9 hPa or more at 20° C. While the second solvent is not as effective as the above-described first solvent, the second solvent still can improve the drying property of the ink, and thus can suppress the occurrence of agglomeration variation in recorded images. In addition, since the second solvent has an excellent effect that maintains the ejection stability of the recording head compared with the first solvent, when used together with the first solvent, the second solvent can effectively suppress the occurrence of agglomeration variation while suppressing the degradation of the ejection stability.

Specifically, the second solvent is at least a solvent selected from a group consisting of (poly)alkylene glycol monoalkyl ether and (poly)alkylene glycol dialkyl ether which have a water vapor pressure of 0.9 hPa or more at 20° C.

The (poly)alkylene glycol monoalkyl ether and the (poly)alkylene glycol dialkyl ether used as the second solvent are not particularly limited as long as the boiling point is 0.9 hPa or more at 20° C., but the (poly)alkylene glycol monoalkyl ether and the (poly)alkylene glycol dialkyl ether are preferably a compound represented by the following formula (1).

$$R^1-(O-R^3)_n-O-R^2 \qquad (1)$$

In the above-described formula (1), $R^1$ represents a hydrogen atom or an alkyl group having 1 to 4 carbon atoms, $R^2$ represents an alkyl group having 1 to 4 carbon atoms, $R^3$ represents an ethylene group or a propylene group, and n represents an integer in a range of 1 to 4. The alkyl group having 1 to 4 carbon atoms can be a linear or branched alkyl group, and specific examples include a methyl group, an ethyl group, an n-propyl group, an iso-propyl group, an n-butyl group, a sec-butyl group, and a tert-butyl group.

Among the compounds represented by the above-described formula (1) which are used as the second solvent, from the viewpoint of superior ejection stability, the compound is preferably at least a compound selected from a group consisting of compounds represented by the following formula (2), the following formula (3) and the following formula (4).

$$HO-R^5-O-R^4 \qquad (2)$$

In the above-described formula (2), $R^4$ represents an alkyl group having 1 to 4 carbon atoms, and $R^5$ represents an ethylene group or a propylene group. The alkyl group having 1 to 4 carbon atoms can be a linear or branched alkyl group, and specific examples include a methyl group, an ethyl group, an n-propyl group, an iso-propyl group, an n-butyl group, a sec-butyl group, and a tert-butyl group.

$$R^6O-R^8-O-R^7 \qquad (3)$$

In the above-described formula (3), $R^6$ and $R^7$ represent a methyl group or an ethyl group respectively, and $R^8$ represents an ethylene group or a propylene group. However, in a case in which $R^8$ is a propylene group, $R^7$ is a methyl group,

$$CH_3-(O-R^{10})_m-O-R^9 \qquad (4)$$

In the above-described formula (4), $R^9$ represents a methyl group or an ethyl group, $R^{10}$ represents an ethylene group or a propylene group, and m represents an integer in a range of 2 to 4.

Specific examples of the compounds represented by the above-described formula (2) include ethylene glycol monomethyl ether (8.3 hPa), ethylene glycol monoethyl ether (5 hPa), ethylene glycol monopropyl ether (1.3 hPa), ethylene glycol monoisopropyl ether (4.4 hPa), ethylene glycol monobutyl ether (1 hPa), propylene glycol monomethyl ether (10 hPa), propylene glycol monoethyl ether, propylene glycol monopropyl ether (2.3 hPa), propylene glycol monoisopropyl ether and the like.

Specific examples of the compounds represented by the above-described formula (3) include ethylene glycol dimethyl ether (64 hPa), ethylene glycol diethyl ether (12.5 hPa), ethylene glycol ethyl methyl ether, propylene glycol dimethyl ether (76 hPa), propylene glycol ethyl methyl ether, and the like.

Specific examples of the compounds represented by the above-described formula (4) include diethylene glycol dimethyl ether (4 hPa), diethylene glycol ethyl methyl ether (0.91 hPa), triethylene glycol dimethyl ether (1.2 hPa), and the like.

Among the above-described specific examples, the compounds which have a water vapor pressure of 0.9 hPa or more at 20° C. can be used as the second solvent.

The water vapor pressure of the second solvent at 20° C. needs to be 0.9 hPa or more, and, from the viewpoint of suppressing the occurrence of agglomeration variation and ensuring the ejection stability, the water vapor pressure is preferably in a range of 0.9 hPa to 4 hPa.

The content of the second solvent needs to be in a range of 2% by mass to 80% by mass, and is preferably in a range of 20% by mass to 70% by mass, and more preferably in a range of 50% by mass to 70% by mass with respect to the total mass of the non-aqueous ink composition. When the content of the second solvent is in the above-described range, it is possible to maintain the ejection stability at a favorable level while suppressing agglomeration variation in recorded images. In contrast, when the content of the second solvent is below the above-described range, there is a case in which the occurrence of agglomeration variation cannot be suppressed, and, when the content of the second solvent is above the above-described range, there is a case in which it becomes impossible to ensure a favorable level of ejection stability.

The sum of the content of the first solvent and the content of the second solvent needs to be 20% by mass or more, and is preferably in a range of 20% by mass to 85% by mass, more preferably in a range of 40% by mass to 80% by mass, and particularly preferably in a range of 60% by mass to 80% by mass with respect to the total mass of the non-aqueous ink composition. When the sum of the content of the first solvent and the content of the second solvent is set to 20% by mass or less, it is possible to suppress the occurrence of agglomeration variation in recorded images. In addition, when the sum of the content of the first solvent and the content of the second solvent is set to 85% by mass or less, it is possible to maintain the ejection stability at a more favorable level.

1.4. Colorant

The non-aqueous ink composition according to the embodiment contains the colorant. A dye or a pigment can be used as the colorant, but a pigment is preferable since the pigment has water resistance, gas resistance, light resistance, and the like.

Any one of well-known inorganic pigments and organic pigments can be used as the pigment, and examples thereof include azo pigments such as azo lake, insoluble azo pigments, condensed azo pigments and chelate azo pigments; polycyclic pigments such as phthalocyanine pigments, perylene and perylene pigments, anthraquinone pigments, quinacridone pigments, dioxazine pigments, thioindigo pigments, isoindolinone pigments and chinophthalon pigments; lake dyes such as basic dye-type lake and acidic dye-type lake; organic pigments such as nitro pigments, nitroso pigments, aniline black and daylight fluorescent pigments; inorganic pigments such as carbon black; and the like. The above-exemplified pigments may be used solely or in a mixture of two or more pigments. The average particle diameter of pigment particles is not particularly limited, but is preferably in a range of 50 nm to 500 nm.

The content of the pigment can be appropriately selected depending on usage or printing characteristics, and is preferably in a range of 0.5% by mass to 20% by mass, and more preferably in a range of 1% by mass to 10% by mass with respect to the total mass of the non-aqueous ink composition.

Meanwhile, in the non-aqueous ink composition, an ordinarily-used arbitrary dispersant can be used from the viewpoint of improving the dispersion stability of the pigment. Specific examples of the dispersant include polyester-based macromolecular compounds such as HINOACT KF1-M, T-6000, T-7000, T-8000, T-8350P, T-8000E (all manufactured by Kawaken Fine Chemicals Co., Ltd.), SOLSPERSE 20000, 24000, 32000, 32500, 33500, 34000, 35200, 37500 (all manufactured by The Lubrizol Corporation), DISPERBYK-161, 162, 163, 164, 166, 180, 190, 191, 192 (all manufactured by BYK Japan KK), FLOWLEN DOPA-17, 22, 33, G-700 (all manufactured by Kyoeisha Chemical Co., Ltd.), AJISPUR-PB821, PB711 (all manufactured by Ajinomoto Co., Ltd.), LP4010, LP4050, LP4055, POLYMER 400, 401, 402, 403, 450, 451, 453 (all manufactured by EFKA Chemicals Company), and the like.

The content fraction of the dispersant can be appropriately selected depending on pigments to be dispersed, and is preferably in a range of 5 parts by mass to 200 parts by mass, and more preferably in a range of 30 parts by mass to 120 parts by mass with respect to the content of the pigment in the non-aqueous ink composition (100 parts by mass).

1.5. Other Components

To the non-aqueous ink composition according to the embodiment, components other than what has been described above may be further added. Examples of the above-described components include a surfactant, a resin, a stabilizer such as an antioxidant or an ultraviolet absorber, solvents other than the first solvent and the second solvent (hereinafter also referred to as "other solvents"), and the like.

Surfactant

From the viewpoint of decreasing the surface tension so as to improve the wettability with recording media, a polyoxyethylene derivative which is a silicon-based surfactant, a fluorine-based surfactant or a non-ionic surfactant may be added to the non-aqueous ink composition.

As the silicon-based surfactant, polyester-denatured silicon or polyether-denatured silicon is preferably used. Specific examples thereof include BYK-347 and 348 (all manufactured by BYK Japan KK).

As the fluorine-based surfactant, a fluorine-denatured polymer is preferably used, and specific examples thereof include BYK-340 (manufactured by BYK Japan KK).

In addition, as the polyoxyethylene derivative, an acetylene glycol-based surfactant is preferably used. Specific examples thereof include SURFYNOL 82, 104, 465, 485, TG (all manufactured by Air Product Japan, Inc.), OLFINE STG, E1010 (all manufactured by Nissin Chemical Co., Ltd.), NISSAN NONION A-10R, A-13R (all manufactured by NOF Corporation), FLOWLEN TG-740W, D-90 (manufactured by Kyoeisha Chemical Co., Ltd.), NOIGEN CX-100 (manufactured by Dai-ichi Kogyo Seiyaku Co., Ltd.), and the like.

The content of the surfactant is preferably in a range of 0.1% by mass to 8% by mass, and more preferably in a range of 0.5% by mass to 5% by mass with respect to the total mass of the non-aqueous ink composition.

Resin

From the viewpoint of adjusting the viscosity of ink or improving the fixability to recording media, a resin may be added to the non-aqueous ink composition. Examples of the resin include fiber-based resins such as acryl resins, styrene acryl resins, rosin-denatured resins, phenol resins, terpene-based resins, polyester resins, polyamide resins, epoxy resins, vinyl chloride and vinyl acetate copolymer resins and cellulose acetate butyrate; vinyl toluene and α-methyl styrene copolymer resins; and the like. The above-described resins may be used solely or in a mixture of two or more resins.

The content of the resin is preferably in a range of 0.1% by mass to 10% by mass, and more preferably in a range of 1% by mass to 5% by mass with respect to the total mass of the non-aqueous ink composition.

Antioxidant

Examples of the antioxidant include BHA (2,3-butyl-4-oxyanisole), BHT (2,6-di-t-butyl-p-cresol), and the like.

Ultraviolet absorber

Examples of the ultraviolet absorber include benzophenone-based compounds, benzotriazole-based compounds, and the like.

Other Solvents

The non-aqueous ink composition according to the embodiment may contain solvents other than the above-described first solvent and the above-described second solvent (hereinafter also referred to as "other solvents"). The other solvents are used for the purpose of adjusting the viscosity of the non-aqueous ink composition, and the like.

A variety of organic solvents that are not classified into the first solvent and the second solvent can be used as the other solvents, and examples thereof include ester-based solvents, ketone-based solvents, alcohol-based solvents, amide-based solvents, (poly)alkylene glycol monoalkyl ether, (poly)alkylene glycol dialkyl ether, and the like.

1.6. Method for Manufacturing the Non-Aqueous Ink Composition

The non-aqueous ink composition according to the embodiment can be manufactured using a well-known conventional method. For example, first, a colorant, a dispersant and (some of) solvents are mixed, a pigment dispersion liquid is prepared using a ball mill, a beads mill, ultrasonic waves, a jet mill or the like, and is adjusted so as to have desired ink characteristics. Subsequently, (the rest of) solvents and other additives (for example, a surfactant or a resin) are added under stirring, and are sufficiently stirred, whereby the non-aqueous ink composition can be obtained.

1.7. Properties

From the viewpoint of the balance between recording qualities and the reliability of an ink composition for ink jet recording, the non-aqueous ink composition according to the embodiment has a surface tension at 20° C. preferably in a range of 20 mN/m to 50 mN/m, and more preferably in a range of 25 mN/m to 40 mN/m. Meanwhile, the surface tension can be measured by confirming the surface tension using an automatic surface tensiometer CBVP-Z (manufactured by Kyowa Interface Science Co., Ltd.) when a platinum plate is wetted with ink in an environment of 20° C.

In addition, from the same viewpoint, the viscosity of the non-aqueous ink composition at 20° C. is preferably in a range of 2 mPa·s to 15 mPa·s, and more preferably in a range of 2 mPa·s to 10 mPa·s. Meanwhile, the viscosity can be measured by increasing the shear rate to a range of 10 to 1000 in an environment of 20° C., and scanning the viscosity at a shear rate of 200 hours using a viscosity analyzer MCR-300 (manufactured by Pysica).

2. Method for Recording Ink Jets

A method for recording ink jets according to an embodiment of the invention includes a step of ejecting the liquid droplets of the non-aqueous ink composition from a recording head so as to attach the liquid droplets to a recording medium (hereinafter, also referred to as "step (a)"). Then, a record including images formed on the recording medium is obtained.

According to the ink jet recording method according to the present embodiment, since the non-aqueous ink composition is used, it is possible to record images which have an excellent ejection stability, an excellent abrasion resistance and an excellent glossiness, and in which agglomeration variation is suppressed.

In the ink jet recording method according to the embodiment, since the non-aqueous ink composition having an excellent drying property as described above is used, it is possible to record favorable images even in an environment in which the relative humidity is 50% RH or more during recording. The above-described recording method enables recording in, for example, high-temperature and high-humidity districts, climate or weather, and an environment in which air conditioning is not sufficient. The upper limit of the environment humidity is preferably 100% RH or less, and more preferably 90% RH or less. In addition, the environment temperature is preferably 25° C. or higher, and more preferably in a range of 25° C. to 40° C. Here, the environment temperature or the environment humidity can be measured using, for example, a temperature and humidity sensor equipped in or on the outside of a chassis of an ink jet recording apparatus. However, since it is necessary to precisely measure the environment temperature or the environment humidity, the temperature and humidity sensor needs to be installed at a place in which there is no influence of heat generated from a recording apparatus due to a heating mechanism for heating recording media described below and the like.

In the ink jet recording method according to the embodiment, the step (a) is preferably carried out on recording media heated to a temperature in a range of 35° C. to 45° C. When the above-described non-aqueous ink composition is attached to recording medium heated as described above, it is possible to improve the drying property of ink, and, in particular, the effect becomes stronger in a highly humid environment.

In addition, the ink jet recording method according to the embodiment may include after-heating through which the recording media are further heated (hereinafter, also referred to as "step (b)") after the step (a). When the ink jet recording method further includes the step (b), it is possible to further improve the drying property of ink in a highly humid environment.

Any apparatus that ejects liquid droplets of the above-described non-aqueous ink composition from a fine nozzle in a recording head so as to attach the liquid droplets to a recording medium can be used as the ink jet recording apparatus that can include the above-described step. Hereinafter, an ink jet printer including a mechanism that can heat recording media will be described as an example of the ink jet recording apparatus that can be used in the embodiment.

FIGURE is a perspective view illustrating the configuration of an ink jet printer that can be used in the embodiment (hereinafter, referred to simply as "printer"). A printer 1 illustrated in FIGURE is a so-called serial printer. The serial printer refers to a printer in which a recording head is mounted in a carriage that moves in a predetermined direction, and the movement of the carriage accompanies the movement of the recording head, thereby ejecting liquid droplets to recording media.

As illustrated in FIGURE, the printer 1 includes a carriage 4 mounting a recording head 2 and a detachable ink cartridge 3, a platen 5 on which a recording medium P disposed below the recording head 2 is transported, a heating mechanism 6 for heating the recording medium, a carriage-moving mechanism 7 that moves the carriage 4 in a medium width direction of the recording medium P, and a medium-feeding mechanism 8 that transports the recording medium P in a medium-feeding direction. In addition, the printer 1 includes a control device CONT which controls all operations of the printer 1. Meanwhile, the medium width direction refers to a principal scanning direction (head scanning direction). The medium-feeding direction refers to a sub scanning direction (a direction that intersects the principal scanning direction).

The ink cartridge 3 is made up of four independent cartridges. Each of four cartridges is loaded with the above-described non-aqueous ink composition. Meanwhile, in the example of FIGURE, the number of the cartridges is four, but the number is not limited thereto, and a desired number of cartridges can be mounted.

The ink cartridge 3 is not necessarily mounted in the carriage 4 as illustrated in FIGURE, and, instead, for example, the ink cartridge may be mounted in a chassis of the printer 1 and supply ink to the head 2 through an ink supply tube.

The carriage 4 is supported by a guide rod 9 which is a supporting member installed in the principal scanning direction. In addition, the carriage 4 is moved in the principal direction along the guide rod 9 using the carriage-moving mechanism 7. Meanwhile, the example of FIGURE illustrates the carriage 4 moving in the principal scanning direction, but the example does not limit the moving direction of the carriage, and the carriage may be moved in the sub scanning direction as well as in the principal scanning direction.

The installation location of the heating mechanism 6 is not particularly limited as long as the heating mechanism can heat the recording medium P. In the example of FIGURE, the heating mechanism 6 is installed in a location which is above the platen 5 and faces the head 2. When the heating mechanism 6 is installed in the location that faces the head 2 as described above, since it is possible to reliably heat the attachment location of the liquid droplets on the recording medium P, it is possible to efficiently dry the liquid droplets attached to the recording medium P.

Examples of the heating mechanism 6 that can be used include a printer heater mechanism in which the recording medium P is brought into contact with a heat source so as to be heated, a mechanism that radiates infrared rays, micro waves (electromagnetic waves having a maximum wavelength at approximately 2,450 MHz) or the like, a dryer mechanism that blows hot air, and the like.

The recording medium P is heated using the heating mechanism 6 before or when liquid droplets ejected from a nozzle hole (not illustrated) are attached to the recording medium P. Then, it is possible to rapidly dry the liquid droplets attached to the recording medium P. Meanwhile, various heating conditions (for example, heating timing, heating temperature, heating time, and the like) are controlled using the control device CONT.

From the viewpoint of improving the drying property of ink, preventing the deformation of the recording medium, improving the abrasion resistance, and improving the intermittent ejection stability, the recording medium P is heated using the heating mechanism 6 in a manner in which the recording medium P is held in a temperature range of 35° C. to 45°. Meanwhile, in the invention of the present application, the temperature at which the recording medium is heated refers to a temperature of the surface of the recording medium which comes into contact with the non-aqueous ink composition.

The printer 1 may further include a second heating mechanism, not illustrated, in addition to the heating mechanism 6. When the printer 1 includes the second heating mechanism, it is possible to carry out the above-described step (b) in the printer 1. The second heating mechanism is installed on a downstream side of the heating mechanism 6 in a transportation direction of the recording medium P. The second heating mechanism heats the recording medium P after the recording medium P is heated using the heating mechanism 6, that is, liquid droplets ejected from the nozzle hole (not illustrated) are attached to the recording medium P. Then, it is possible to further improve the drying property of the liquid droplets of the non-aqueous ink composition attached to the recording medium P. Any mechanisms described in the heating mechanism 6 section (for example, the dryer mechanism and the like) can be used as the second heating mechanism.

For the same reason as heating using the heating mechanism 6, the recording medium P is heated using the second heating mechanism in a manner in which the recording medium P is held in a temperature range of 35° C. to 45° C. In a case in which the temperature of the recording medium P exceeds 45° C., there is a case in which the recording medium P deforms depending on the type of the recording medium or a disadvantage such as the contraction of recorded images occurs during the heating and cooling of the recording medium P. In addition, there are problems in that the power consumption of a heater used for heating increases and an increased amount of heat is exhausted from the printer due to the heating mechanism, and therefore, in consideration of what has been described above, the upper limit of the temperature of the recording medium is preferably 45° C.

A linear encoder 10 detects the location of the carriage 4 in the principal scanning direction as a signal. The detected signal is sent to the control device CONT as location information. The control device CONT recognizes the scanning location of the recording head 2 based on the location information from the linear encoder 10, and controls the recording operation (ejection operation) and the like of the recording head 2. In addition, the control device CONT has a configuration that can control the change of the moving speed of the carriage 4.

The recording medium P is not particularly limited, and, according to the ink jet recording method of the embodiment, the abrasion resistance or drying property of recorded images or letters becomes favorable even in a case in which low-absorbent recording media are used. Here, the "low-absorbent recording medium" refers to a recording medium that absorbs 10 mL/m$^2$ or less of water for 30 msec$^{1/2}$ from the beginning of the contact in the Bristow method, and at least a recording surface of the recording medium preferably has the above-described property. According to the above-described definition, non-absorbent recording media that absorb no water are also considered as the "low-absorbent recording media" of the invention. The Bristow method is a most widely distributed method as a method for measuring the amount of water absorbed for a short period of time, and is also employed by Japan Technical Association of the pulp and paper industry (JAPAN TAPPI). The details of the test method are described in Standard No. 51 "Paper and paperboard— liquid absorbability test methods—Bristow method" in "JAPAN TAPPI paper and pulp test methods (2000)".

Specific examples of the low-absorbent recording media include sheets, films, fiber products and the like which contain a low-absorbent material. In addition, recording media including a layer which contains a low-absorbent material (hereinafter, also referred to as "low-absorbent layer") on a surface of a base material (for example, paper, a fiber, leather, plastic, glass, a ceramic, a metal or the like) may be considered as the low-absorbent recording media. The low-absorbent material is not particularly limited, and examples thereof include olefin-based resins, ester-based resins, urethane-based resins, acryl-based resins, vinyl chloride-based resins, and the like.

Among the above-described materials, materials having a recording surface which contains a vinyl chloride-based resin can be preferably used as the low-absorbent recording media. The above-described non-aqueous ink composition contains lactone, and the lactone dissolves the recording surface which contains a vinyl chloride resin, whereby the non-aqueous ink composition can be infiltrated into recording medium. Then, it is possible to improve the abrasion resistance of images or letters recorded on the recording surface which contains a vinyl chloride-based resin even in a highly humid environment. Specific examples of the vinyl chloride resin include polyvinyl chloride, vinyl chloride and ethylene copolymers, vinyl chloride and vinyl acetate copolymers, vinyl chloride and vinyl ether copolymers, vinyl chloride and vinylidene chloride copolymers, vinyl chloride and maleic acid ester copolymers, vinyl chloride and (meth)acrylic acid copolymers, vinyl chloride and (meth)acrylic acid ester copolymers, vinyl chloride and urethane copolymer, and the like. Meanwhile, there is no particular limitation in the various characteristics of the low-absorbent recording medium, such as thickness, shape, color, softening point and hardness.

3. Examples

Hereinafter, the invention will be more specifically described using examples and comparative examples, but the invention is not limited to the examples.

3.1. Preparation of the Non-Aqueous Ink Composition

Lactone, the first solvent and the second solvent were injected to a container at amounts that were equivalent to the concentrations described in Tables 1 and 2 for each ink, were mixed and stirred using a magnetic stirrer for 30 minutes, thereby obtaining a solvent mixture.

Some of the obtained solvent mixture was separated, a predetermined amount of a cyan pigment (C.I. Pigment Blue 15:3) was added to the separated solvent mixture, and a crushing treatment was carried out using a homogenizer. After that, a dispersion treatment was carried out using a beads mill loaded with zirconia beads having a diameter of 0.3 mm, thereby obtaining a pigment dispersion element having an average particle diameter of 150 nm.

Lactone, the rest of the first solvent and the second solvent, BYK-340 (manufactured by BYK Japan KK, fluorine-based surfactant), a vinyl chloride and vinyl acetate copolymer resin (trade name "SOLBIN CL", manufactured by Nissin Chemical Co., Ltd.) were added to the obtained pigment dispersion element, additionally mixed and stirred for 1 hour, and filtered using a 5 µm PTFE membrane filter, thereby obtaining non-aqueous ink compositions according to the examples and the comparative examples described in Tables 1 and 2. Meanwhile, numeric values in the tables represent % by mass except for the value of the water vapor pressure.

Among components described in Tables 1 and 2, components indicated using trade names or abbreviation are as described below.

Cyan pigment (C.I. Pigment Blue 15:3)

Vinyl chloride and vinyl acetate copolymer resin (trade name "SOLBIN CL", manufactured by Nissin Chemical Co., Ltd.)

BYK-340 (trade name, manufactured by BYK Japan KK, fluorine-based surfactant)

3.2. Evaluation Tests

Evaluation samples were produced as described below for evaluation tests.

First, the temperature and humidity of an environment laboratory were respectively adjusted to 35° C. and 55% RH using an air conditioning facility and a humidifier. Meanwhile, the temperature and humidity were measured using a temperature and humidity sensor installed on a chassis in which there was no influence of heat generated from a heater and the like in an ink jet printer.

Meanwhile, a part of the ink jet printer (manufactured by Seiko Epson Corporation, "PX-G5000") was reformed to equip a heater that could change the temperature in a paper guide portion, whereby it became possible to heat and adjust the temperature of a recording medium (manufactured by Roland DG Corporation, trade name "SV-G-1270G", glossy polyvinyl chloride sheet) during the recording of images. In addition, the above-prepared non-aqueous ink composition was loaded into an exclusive cartridge in the printer. The printer was installed in the environment laboratory.

In addition, the surface temperature of the recording medium was heated to 40° C. using heaters equipped in the paper guide portion and a platen in the printer. The surface temperature of the recording medium was measured using a non-contact method. Next, liquid droplets of the non-aqueous ink composition were ejected in a state in which the temperature was held so as to carry out an operation of attaching the liquid droplets to the glossy polyvinyl chloride sheet, thereby obtaining an evaluation sample in which solid pattern images were recorded on the glossy polyvinyl chloride sheet. Meanwhile, recording was carried out under conditions of a resolution of 720 dpi (vertical)×720 dpi (horizontal) and duty 100%. Here, the "duty value" refers to a value computed using the following formula.

$$\text{duty (\%)} = (\text{number of actually ejected dots}/(\text{vertical resolution} \times \text{horizontal resolution})) \times 100$$

In the formula, "number of actually ejected dots" refers to the number of actually ejected dots per unit area, and "vertical resolution" and "horizontal resolution" respectively refer to resolution per unit area.

Furthermore, a heater that could change the temperature was equipped at a location which could face a nozzle and was on a downstream side of a transportation direction of the recording medium in a recording medium transportation path in the printer. Using this heater, the recording medium to which ink had been attached were heated at 40° C. for 1 minute.

3.2.1. Evaluation of the Abrasion Resistance

The temperature of the evaluation sample obtained in the above manner was returned to room temperature (25° C.), and then the abrasion was evaluated using a Gakushin-type rubbing tester (manufactured by Tester Sangyo Co., Ltd., trade name "AB-301") in accordance with JIS K5701 (ISO 11628). That is, a cotton cloth was placed on the recording surface of the evaluation sample, reciprocated 20 times with a load of 500 g so as to be abraded, and the peeling state of the abraded recording surface of the evaluation sample was visually observed. The evaluation results are described in both Tables 1 and 2. Meanwhile, the evaluation criteria are as described below.

A: There was no contamination on the cotton cloth. The recording surface was not scratched.
B: There was a recorded substance attached to the cotton cloth. The recording surface was rarely scratched.
C: There was a recorded substance attached to the cotton cloth. The recording surface was scratched.

3.2.2. Evaluation of the Agglomeration Variation

The temperature of the evaluation sample obtained in the above manner was returned to room temperature (25° C.), and then the agglomeration variation of the pigment on the recording surface of the evaluation sample was visually observed, thereby evaluating agglomeration variation. The evaluation results are described in both Tables 1 and 2. Meanwhile, the evaluation criteria are as described below.

A: Agglomeration variation was not observed.
B: Agglomeration variation was slightly observed.
C: Agglomeration variation was distinct.

3.2.3. Evaluation of the Glossiness

The temperature of the evaluation sample obtained in the above manner was returned to room temperature (25° C.), and then the glossiness of the recording surface with respect to 20°-reflection was measured using a glossmeter MULTI Gloss 268 (manufactured by Konica Minolta). The evaluation results are described in both Tables 1 and 2. Meanwhile, the evaluation criteria are as described below.

A: 40 or more
B: 30 to less than 40
C: less than 30

3.2.4. Evaluation of the Ejection Stability (Intermittent Ejection Stability)

The liquid droplets of each ink was continuously ejected for 300 seconds from the respective nozzles in the head in a state in which the frequency of a piezo element was set to 5 kHz, and the driving waveform of the piezo element was optimized, and then the ejection of the liquid droplets was stopped for 300 seconds (one sequence). After that, 10 sequences of an operation of the continuous ejection of the liquid droplets and the stopping of the ejection were repeated in the same manner. After the end of 10 sequences, out of 360 nozzles, the number of nozzles that did not eject the liquid droplets was counted, thereby evaluating the intermittent ejection stability. The evaluation results are described in both Tables 1 and 2. Meanwhile, the evaluation criteria are as described below.

A: The number of nozzles that did not eject the liquid droplets was 0 or 1.
B: The number of nozzles that did not eject the liquid droplets was 2 or 3.
C: The number of nozzles that did not eject the liquid droplets was 4 or more.

3.3. Evaluation Results

Tables 1 and 2 describe the compositions and evaluation results of the non-aqueous ink compositions according to the respective examples and the respective comparative examples.

TABLE 1

| Components of non-aqueous ink composition | | Vapor pressure (20° C.) [hPa] | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|---|---|---|---|---|---|---|---|
| Pigment | Cyan pigment | — | 4 | 4 | 4 | 4 | 4 | 4 | 4 | 4 | 4 | 4 | 4 | 4 | 4 | 4 | 4 | 4 | 4 | 4 | 4 | 4 |
| Lactone | γ-butyrolactone | 1.5 | 20 | 20 | 20 | 20 | 20 | 20 | 20 | 20 | 20 | 20 | 20 | 20 | 5 | 40 | 20 | 20 | 20 | 20 | 20 | 5 |
|  | σ-valerolactone | 1 |  | 10 |  |  |  |  |  |  |  |  |  |  |  |  |  |  |  |  |  | 5 |
| First solvent | Cyclopentanone | 15 | 10 |  | 10 |  |  |  |  |  |  |  | 10 | 10 | 10 | 10 | 5 | 18 | 18 | 5 | 10 |  |
|  | Butyl acetate | 12 |  |  |  |  |  |  |  |  |  |  |  |  |  |  |  |  |  |  |  |  |
|  | 3-methylbutyl acetate (isopentyl acetate) | 8 |  |  |  | 10 |  |  |  |  |  |  |  |  |  |  |  |  |  |  |  |  |
|  | 1-butanol | 7 |  |  |  |  | 10 |  |  |  |  |  |  |  |  |  |  |  |  |  |  |  |
|  | Cyclohexanone | 5 |  |  |  |  |  | 10 |  |  |  |  |  |  |  |  |  |  |  |  |  |  |
|  | Methyl lactate | 3.9 |  |  |  |  |  |  | 10 |  |  |  |  |  |  |  |  |  |  |  |  |  |
|  | N,N-dimethylacetoamide | 3.3 |  |  |  |  |  |  |  | 10 |  |  |  |  |  |  |  |  |  |  |  |  |
|  | 3-methoxybutyl acetate (3-methoxybutyl acetate) | 3.2 |  |  |  |  |  |  |  |  | 10 |  |  |  |  |  |  |  |  |  |  |  |
|  | Ethyl lactate | 2.8 |  |  |  |  |  |  |  |  |  | 10 |  |  |  |  |  |  |  |  |  |  |
| Second solvent | Diethylene glycol dimethylether | 4 | 60 | 60 | 60 | 60 | 60 | 60 | 60 | 60 | 60 | 60 |  | 60 |  | 40 | 65 | 52 | 2 | 15 | 10 | 80 |
|  | Tetraethylene glycol dimethylether | 1.2 |  |  |  |  |  |  |  |  |  |  | 60 |  |  |  |  |  |  |  |  |  |
|  | Diethylene glycol ethylmethylether | 0.91 |  |  |  |  |  |  |  |  |  |  |  | 60 |  |  |  |  |  |  |  |  |
| Other solvents | Diethylene glycol diethylether | 0.55 |  |  |  |  |  |  |  |  |  |  |  |  |  |  |  |  | 50 | 50 | 50 |  |
|  | 3-methoxy-3-methylbutyl acetate | 0.53 |  |  |  |  |  |  |  |  |  |  |  |  |  |  |  |  |  |  |  |  |
|  | Butyl lactate | 0.43 |  |  |  |  |  |  |  |  |  |  |  |  | 75 |  |  |  |  |  |  |  |
| Other components | Vinyl chloride and vinyl acetate copolymer resin | — | 3 | 3 | 3 | 3 | 3 | 3 | 3 | 3 | 3 | 3 | 3 | 3 | 3 | 3 | 3 | 3 | 3 | 3 | 3 | 3 |
|  | BYK-340 | — | 3 | 3 | 3 | 3 | 3 | 3 | 3 | 3 | 3 | 3 | 3 | 3 | 3 | 3 | 3 | 3 | 3 | 3 | 3 | 3 |
| Evaluation result | Total (% by mass) |  | 100 | 100 | 100 | 100 | 100 | 100 | 100 | 100 | 100 | 100 | 100 | 100 | 100 | 100 | 100 | 100 | 100 | 100 | 100 | 100 |
|  | Abrasion resistance |  | A | A | A | A | A | A | A | A | A | A | A | A | B | A | A | A | A | A | A | B |
|  | Agglomeration variation |  | A | A | A | A | A | A | B | B | B | B | B | B | A | A | B | A | B | B | B | A |
|  | Glossiness |  | A | A | A | A | A | A | A | A | A | A | A | A | A | B | A | B | A | A | A | A |
|  | Intermittent ejection stability |  | A | A | A | A | A | A | A | A | A | A | A | A | A | A | A | A | A | A | A | A |

TABLE 2

| Components of non-aqueous ink composition | | Vapor pressure (20° C.) [hPa] | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|---|---|
| Pigment | Cyan pigment | — | 4 | 4 | 4 | 4 | 4 | 4 | 4 | 4 | 4 | 4 | 4 | 4 | 4 |
| Lactone | γ-butyrolactone | 1.5 | 1 | 50 | 20 | 20 | 20 | 3 | 10 | 10 | 10 | | | 20 | 20 |
| | σ-valerolactone | 1 | | | | | | | | | | | | | |
| First solvent | Cyclopentanone | 15 | 10 | 10 | 1 | | 10 | 5 | | | | | | 5 | |
| | Butyl acetate | 12 | | | | 20 | | | | | | 18 | | | 20 |
| | 3-methylbutyl acetate (isopentyl acetate) | 8 | | | | | | | | | | | | | |
| | 1-butanol | 7 | | | | | | | | | | | | | |
| | Cyclohexanone | 5 | | | | | | | | | | | | | |
| | Methyl lactate | 3.9 | | | | | | | | | | | | | |
| | N,N-dimethylacetoamide | 3.3 | | | | | | | | | | | | | |
| | 3-methoxybutyl acetate (3-methoybutyl acetate) | 3.2 | | | | | | | | | | | | | |
| | Ethyl lactate | 2.8 | | | | | | | | | | | | | |
| Second solvent | Diethylene glycol dimethylether | 4 | 40 | 30 | 69 | 50 | | 82 | | | | | 40 | 10 | |
| | Tetraethylene glycol dimethylether | 1.2 | | | | | | | | | | | | | |
| | Diethylene glycol ethylmethylether | 0.91 | | | | | | | | | | | | | |
| Other solvents | Diethylene glycol dimethylether | 0.55 | 39 | | | | 60 | | 80 | | | | | | |
| | Diethylene glycol diethylether | 0.53 | | | | | | | | 80 | | | | | |
| | 3-methoxy-3-methylbutyl acetate | 0.43 | | | | | | | | | 80 | | | | |
| | Butyl lactate | — | | | | | | | | | | 72 | 50 | 55 | 50 |
| Other components | Vinyl chloride and vinyl acetate copolymer resin | — | 3 | 3 | 3 | 3 | 3 | 3 | 3 | 3 | 3 | 3 | 3 | 3 | 3 |
| | BYK-340 | — | 3 | 3 | 3 | 3 | 3 | 3 | 3 | 3 | 3 | 3 | 3 | 3 | 3 |
| Evaluation result | Total (% by mass) | | 100 | 100 | 100 | 100 | 100 | 100 | 100 | 100 | 100 | 100 | 100 | 100 | 100 |
| | Abrasion resistance | | C | A | A | A | A | B | A | A | A | C | C | A | A |
| | Agglomeration variation | | A | A | C | A | C | A | C | C | C | C | C | C | A |
| | Glossiness | | A | C | A | B | A | A | A | A | A | A | A | A | A |
| | Intermittent ejection stability | | A | B | A | C | A | C | A | A | A | A | A | A | C |

It was found that, according to the non-aqueous ink compositions of the examples, it is possible to obtain images that have an excellent ejection stability during recording, can sufficiently suppress the occurrence of agglomeration variation, and have an excellent abrasion resistance and an excellent glossiness.

In contrast to the examples, in Comparative Example 1, since the non-aqueous ink composition containing less than 5% by mass of lactone was used, the non-aqueous ink composition did not have a sufficient capacity to dissolve the surface of the glossy polyvinyl chloride sheet, and images having a poor abrasion resistance were recorded.

In Comparative Example 2, since the non-aqueous ink composition containing more than 40% by mass of lactone was used, the ink excessively infiltrated into the recording medium, and the flatness of the surfaces of images degraded such that images having a poor glossiness were recorded.

In Comparative Example 3, since the non-aqueous ink composition containing less than 5% by mass of the first solvent was used, the drying property of the ink was not excellent, and it was not possible to sufficiently suppress the occurrence of agglomeration variation in recorded images.

In Comparative Example 4, it was found that, since the non-aqueous ink composition containing more than 18% by mass of the first solvent was used, the drying property of the ink was too strong, and the ejection stability during recording degraded.

In Comparative Example 5, since the non-aqueous ink composition which contained no second solvent and had a sum of the content of the first solvent and the content of the second solvent of less than 20% by mass was used, it was not possible to sufficiently suppress the occurrence of agglomeration variation in recorded images.

In Comparative Example 6, it was found that, since the non-aqueous ink composition containing more than 80% by mass of the second solvent was used, the drying property of the ink was too strong, and the ejection stability during recording degraded.

In Comparative Examples 7 to 9, since the non-aqueous ink composition containing no first solvent and no second solvent was used, the drying property of the ink was not excellent, and it was not possible to sufficiently suppress the occurrence of agglomeration variation in recorded images.

In Comparative Example 10, since the non-aqueous ink composition containing no lactone and no second solvent was used, the abrasion resistance of recorded images degraded such that it was not possible to sufficiently suppress the occurrence of agglomeration variation in recorded images.

In Comparative Example 11, since the non-aqueous ink composition containing no lactone and no first solvent was used, the abrasion resistance of recorded images degraded such that it was not possible to sufficiently suppress the occurrence of agglomeration variation in recorded images.

In Comparative Example 12, since the non-aqueous ink composition which had a sum of the content of the first solvent and the content of the second solvent of less than 20% by mass was used, the drying property of the ink was not excellent, and it was not possible to sufficiently suppress the occurrence of agglomeration variation in recorded images.

In Comparative Example 13, the first solvent was not used, and the ejection stability (intermittent stability) during recording was not sufficient.

Meanwhile, the evaluation tests of agglomeration variation were carried out in the same manner as in Example 1, Comparative Examples 3 and 5 except for the fact that the environment humidity was set to 40%. As a result, in examples that corresponded to Example 1, the same evaluation results as in Example 1 were obtained. In contrast, in examples that corresponded to Comparative Examples 3 and 5, the evaluation results were more preferable than those of Comparative Examples 3 and 5; however, generally, there was a tendency of ejection stability degrading. From the above-described fact, it was found that the non-aqueous ink composition according to the invention is particularly useful in a case in which the environment humidity is 50% or more.

In addition, the evaluation tests were carried out in the same manner as in Example 1 and Comparative Example 1 except for the fact that the heating temperature (of the step (a)) during recording was set to 50° C. As a result, in examples that corresponded to Example 1, the intermittent ejection stability was B. Meanwhile, in examples that corresponded to Comparative Example 1, the abrasion resistance slightly improved compared with the evaluation results of Comparative Example 1.

Furthermore, the evaluation tests were carried out in the same manner as in Example 1 and Comparative Example 1 except for the fact that the heating temperature (of the step (b)) after recording was set to 50° C. As a result, in examples that corresponded to Example 1, there was no change. Meanwhile, in examples that corresponded to Comparative Example 1, the abrasion resistance slightly improved compared with the evaluation results of Comparative Example 1. However, in all examples in which the heating temperature during recording or after recording was set to 50° C., there was no recording medium deformed due to heat. From the above-described fact, it was found that the non-aqueous ink composition according to the invention is particularly useful in a case in which the heating temperature of the recording medium during recording is in a range of 35° C. to 45° C.

The invention is not limited to the above-described embodiments, and can be modified in various manners. For example, the invention includes configurations that are substantially the same as the configuration described in the embodiments (for example, configurations having the same functions, methods and results or configurations having the same purposes and effects). In addition, the invention includes configurations in which unessential portions of the configuration described in the embodiment are substituted. In addition, the invention includes configurations exhibiting the same actions and effects as the configuration described in the embodiment or configurations that can achieve the same purposes. In addition, the invention includes configurations obtained by adding well-known techniques to the configuration described in the embodiment.

The entire disclosure of Japanese Patent Application No.: 2013-059599, filed Mar. 22, 2013 is expressly incorporated by reference herein.

What is claimed is:

1. A non-aqueous ink composition for ink jet recording comprising:
   a colorant;
   lactone having a content in a range of 5% by mass to 40% by mass;
   a first solvent having a water vapor pressure of 2 hPa or more and a content in a range of 5% by mass to 18% by mass at 20° C. other than a second solvent; and
   the second solvent having a water vapor pressure of 0.9 hPa or more and a content in a range of 2% by mass to 80% by mass at 20° C.,
   wherein a sum of the content of the first solvent and the content of the second solvent is 20% by mass or more, and the second solvent is at least one solvent selected from a group including (poly)alkylene glycol monoalkyl ether and (poly)alkylene glycol dialkyl ether.

2. The non-aqueous ink composition for ink jet recording according to claim 1,
wherein a number of carbon atoms in the lactone is in a range of 2 to 9.

3. The non-aqueous ink composition for ink jet recording according to claim 1,
wherein the first solvent is at least one solvent selected from a group including ester-based solvents, ketone-based solvents, alcohol-based solvents and amide-based solvents.

4. The non-aqueous ink composition for ink jet recording according to claim 1,
wherein the second solvent is a compound represented by the following formula (1), $$R^1\text{—}(O\text{—}R^3)_n\text{—}O\text{—}R^2 \quad (1)$$

in the above-described formula (1), $R^1$ represents a hydrogen atom or an alkyl group having 1 to 4 carbon atoms, $R^2$ represents an alkyl group having 1 to 4 carbon atoms, $R^3$ represents an ethylene group or a propylene group, and n represents an integer in a range of 1 to 4.

5. The non-aqueous ink composition for ink jet recording according to claim 1,
wherein the content of the lactone is in a range of 10% by mass to 30% by mass.

6. The non-aqueous ink composition for ink jet recording according to claim 1,
wherein the content of the first solvent is in a range of 5% by mass to 15% by mass.

7. The non-aqueous ink composition for ink jet recording according to claim 1,
wherein the content of the second solvent is in a range of 20% by mass to 70% by mass.

8. The non-aqueous ink composition for ink jet recording according to claim 1,
wherein the second solvent is at least a solvent selected from a group including compounds represented by the following formula (2), the following formula (3) and the following formula (4), $$HO\text{—}R^5\text{—}O\text{—}R^4 \quad (2)$$

in the above-described formula (2), $R^4$ represents an alkyl group having 1 to 4 carbon atoms, and $R^5$ represents an ethylene group or a propylene group, $$R^6O\text{—}R^8\text{—}O\text{—}R^7 \quad (3)$$

in the above-described formula (3), $R^6$ and $R^7$ represent a methyl group or an ethyl group respectively, and $R^8$ represents an ethylene group or a propylene group; however, in a case in which $R^8$ is a propylene group, $R^7$ is a methyl group, $$CH_3\text{—}(O\text{—}R^{10})_m\text{—}O\text{—}R^9 \quad (4)$$

in the above-described formula (4), $R^9$ represents a methyl group or an ethyl group, $R^{10}$ represents an ethylene group or a propylene group, and m represents an integer in a range of 2 to 4.

9. The non-aqueous ink composition for ink jet recording according to claim 1,
wherein a resin is further contained, and
the colorant is a pigment.

10. An ink jet recording method comprising:
ejecting liquid droplets of the non-aqueous ink composition according to claim 1 from a recording head so as to attach the liquid droplets to a recording medium.

11. An ink jet recording method comprising:
ejecting liquid droplets of the non-aqueous ink composition according to claim 2 from a recording head so as to attach the liquid droplets to a recording medium.

12. An ink jet recording method comprising:
ejecting liquid droplets of the non-aqueous ink composition according to claim 3 from a recording head so as to attach the liquid droplets to a recording medium.

13. An ink jet recording method comprising:
ejecting liquid droplets of the non-aqueous ink composition according to claim 4 from a recording head so as to attach the liquid droplets to a recording medium.

14. An ink jet recording method comprising:
ejecting liquid droplets of the non-aqueous ink composition according to claim 5 from a recording head so as to attach the liquid droplets to a recording medium.

15. An ink jet recording method comprising:
ejecting liquid droplets of the non-aqueous ink composition according to claim 6 from a recording head so as to attach the liquid droplets to a recording medium.

16. An ink jet recording method comprising:
ejecting liquid droplets of the non-aqueous ink composition according to claim 7 from a recording head so as to attach the liquid droplets to a recording medium.

17. An ink jet recording method comprising:
ejecting liquid droplets of the non-aqueous ink composition according to claim 8 from a recording head so as to attach the liquid droplets to a recording medium.

18. An ink jet recording method comprising:
ejecting liquid droplets of the non-aqueous ink composition according to claim 9 from a recording head so as to attach the liquid droplets to a recording medium.

19. The ink jet recording method according to claim 10,
wherein recording is carried out in an environment having a humidity of 50% RH or more.

20. The ink jet recording method according to claim 10,
wherein, in attaching the liquid droplets to the recording medium, a heating temperature of the recording medium is in a range of 35° C. to 45° C.

21. The non-aqueous ink composition for ink jet recording according to claim 1,
wherein the content of the second solvent is 52% by mass or more.

* * * * *